(12) United States Patent
Shin et al.

(10) Patent No.: US 11,592,420 B2
(45) Date of Patent: Feb. 28, 2023

(54) CLOSED-LOOP PH CONTROL WITH DIFFERENTIAL SENSOR

(71) Applicant: Robert Bosch GmbH, Stuttgart (DE)

(72) Inventors: Young Shik Shin, Mountain View, CA (US); Nadezda Fomina, Redwood City, CA (US); Christopher Johnson, Can Carlos, CA (US); Armin Darvish, Brisbane, CA (US); Efthymios Papageorgiou, San Jose, CA (US); Christoph Lang, Sunnyvale, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 235 days.

(21) Appl. No.: 16/931,727

(22) Filed: Jul. 17, 2020

(65) Prior Publication Data

US 2022/0018806 A1    Jan. 20, 2022

(51) Int. Cl.
  *G01N 27/414*    (2006.01)
  *G01N 27/30*    (2006.01)

(52) U.S. Cl.
  CPC ....... *G01N 27/4148* (2013.01); *G01N 27/301* (2013.01); *G01N 27/302* (2013.01)

(58) Field of Classification Search
  CPC .. G01N 27/401; G01N 27/302; G01N 27/414; G01N 27/4148
  See application file for complete search history.

(56) References Cited

U.S. PATENT DOCUMENTS 4,152,215 A * 5/1979 Yoshino ................. G05D 21/02
                                              47/62 N
6,444,111 B1   9/2002 Montgomery
                      (Continued)

FOREIGN PATENT DOCUMENTS

WO        2017005587 A1    1/2017

OTHER PUBLICATIONS

Merriam-Webster dictionary definition of "immersed" downloaded Aug. 13, 2022 from https://www.merriam-webster.com/dictionary/immerse (Year: 2022).*

(Continued)

*Primary Examiner* — Alexander S Noguerola
(74) *Attorney, Agent, or Firm* — Michael Best & Friedrich LLP

(57) ABSTRACT

Closed-loop systems and methods for controlling pH. The system includes a working electrode, a counter electrode, a reference electrode, a first ion-sensitive field-effect transistor (ISFET), a second ISFET, and an electronic controller. The working electrode, the counter electrode, the reference electrode, and a first sensing terminal of the first ISFET are immersible in an active solution. A second sensing terminal of the second ISFET is immersible in a reference solution. The electronic controller is configured to apply a first amount of current or voltage to the working electrode and determine a differential voltage between the first ISFET and the second ISFET. The electronic controller is also configured to set a second amount of current or voltage to reduce a difference between the differential voltage and a target voltage. The electronic controller is further configured to apply the second amount of current or voltage to the working electrode.

20 Claims, 10 Drawing Sheets

(56) References Cited

U.S. PATENT DOCUMENTS

| | | | |
|---|---|---|---|
| 6,624,637 B1* | 9/2003 | Pechstein | G01N 27/4148 324/438 |
| 6,653,124 B1* | 11/2003 | Freeman | F16K 99/0001 435/297.1 |
| 9,075,041 B2 | 7/2015 | Kavusi et al. | |
| 9,766,197 B2 | 9/2017 | Johnson et al. | |
| 9,810,688 B2 | 11/2017 | Fomina et al. | |
| 9,874,538 B2 | 1/2018 | Johnson et al. | |
| 9,910,008 B2 | 3/2018 | Johnson et al. | |
| 10,011,549 B2 | 7/2018 | Johnson et al. | |
| 10,041,905 B2 | 8/2018 | Johnson et al. | |
| 10,379,080 B2 | 8/2019 | Johnson et al. | |
| 2002/0008038 A1 | 1/2002 | Heller et al. | |
| 2015/0024509 A1 | 1/2015 | Toumazou et al. | |
| 2017/0010238 A1 | 1/2017 | Johnson et al. | |
| 2019/0018004 A1 | 1/2019 | Shin et al. | |

OTHER PUBLICATIONS

Zoulias et al., A Review on Water Electrolysis 2006, download https://d1wqtxts1xzle7.cloudfront.net/32222925/A_REVIEW_ON_WATER_ELECTROLYSIS-with-cover-page-v2.pdf?Expires=1660414263&Signature=bkaNKH7x1CbyS6aQAOgrMUF2-yAXe8wnblMNcxYOeHydya7zXOZLzBwu9vXaXMRgu3hc72Iw7527UprV2uZm0F-FFQUme8h1YRkZw23 (Year: 2016).*

De Beers et al., "PEM water electrolysis: preliminary investigations using neutron radiography," Physics Procedia 88 (2017) 19-26 (Year: 2017).*

Online article ChemistryWorld by Isobel Marr entitled, "Membrane-less electrolyser set to disrupt water splitting", published Apr. 19, 2015, https://www.chemistryworld.com/news/membrane-less-electrolyser-set-to-disrupt-water-splitting/8458.article (Year: 2015).*

Stucki et al., "Hydrogen Production by Water Electrolysis," Europhys. News, vol. 12 No. 8-9 (1981) 9-11 (Year: 1981).*

Fomina et al., "An electrochemical platform for localized pH control on demand," Lab Chip, 2016, vol. 16, pp. 2236-2244.

Morimoto et al., "Automatic Electrochemical Micro-pH-State for Biomicrosystems" Analytical Chemistry, vol. 80, No. 4, Feb. 2008, pp. 905-914.

Van Der Shoot et al., "The pH Static Enzyme Sensor An ISFET-based Enzyme Sensor, Insensitive to the Buffer Capacity of the Sample", Analytics Chimica Acta, vol. 199, 1987, pp. 157-160.

U.S. Appl. No. 16/355,113, filed Mar. 15, 2019 by Shin et al.

* cited by examiner

Feedback-Controlling Section    Non-Feedback-Controlling Section

US 11,592,420 B2

CLOSED-LOOP PH CONTROL WITH DIFFERENTIAL SENSOR

FIELD

The disclosure relates generally to closed-loop pH control. More specifically, the disclosure relates to closed-loop pH control with a differential ion-sensitive field-effect transistor (ISFET) scheme.

BACKGROUND pH is a factor that plays an important role for the binding interactions among biomolecules, enzymatic activities, chemical modification such as protection/deprotection of a functional group, chemical/biochemical reaction kinetics, and visualization of pH sensitive reporter molecules. Since pH can serve as a universal switch or a controller for various types of processes, precise control of pH, especially for controlling multiple conditions in parallel, can offer great opportunities in various applications.

Currently, the pH of a sample is commonly changed by exchanging the whole buffer solution with the target pH or adding acid or base to the solution. This process is time consuming, prone to error, and, in many cases, induces a significant dilution to the sample. If the sample volume is small or multiple rounds of pH changes during the course of an assay or a reaction are required, currently available technology cannot provide a good solution. Thus, there remains a need for a technical solution that enables controlling pH with flexible temporal and spatial target values and a minimal dilution factor for multiple research and industrial applications.

Reported approaches include the electronic pH control described in U.S. Pat. No. 10,379,080, the entire content of which is incorporated herein by reference. A similar pH control scheme can be used in various design formats, especially in an array format to perform highly multiplexed, independent measurements and reactions in parallel within the same sample solution. When using an array of electrodes to locally control the microenvironment near each of the electrodes, "cross-talk" or "bleed-over" between different sites is a common concern. This problem is addressed either through spacing out the individual sites, or with a buffering reagent added to the bulk solution. The former approach results in the reduced density of the array (larger device size), and the latter requires that the rate of electrochemical reaction is high enough to overcome the buffering capacity of the bulk solution. In practice, it means applying higher voltage or current, or using higher concentration of electroactive molecules. These measures may lead to side reactions involving other components of the reaction system. Here, the present disclosure describes how the utilization of the closed-loop control counteracts these issues. In particular, several implementations of the closed-loop in a high-density array of individually addressable electrodes are described.

SUMMARY

The present disclosure provides a closed-loop system for controlling pH including, in some implementations, a feedback electrode set and an electronic controller. The feedback electrode set includes a working electrode, a counter electrode, a reference electrode, a first ion-sensitive field-effect transistor (ISFET), and a second ISFET. The working electrode, the counter electrode, and the reference electrode are immersible in an active solution. The first ISFET includes a first sensing terminal that is immersible in the active solution. The second ISFET includes a second sensing terminal that is immersible in a reference solution. The electronic controller is coupled to the feedback electrode set. The electronic controller is configured to apply a first amount of current or voltage to the working electrode. The electronic controller is also configured to determine a differential voltage between the first ISFET and the second ISFET. The electronic controller is further configured to determine a difference between the differential voltage and a target voltage. The electronic controller is also configured to set a second amount of current or voltage to reduce the difference between the differential voltage and the target voltage. The electronic controller is further configured to apply the second amount of current or voltage to the working electrode.

The present disclosure also provides a closed-loop method for controlling pH including immersing a working electrode, a counter electrode, a reference electrode, and a first sensing terminal of a first ion-sensitive field-effect transistor (ISFET) in an active solution. The method also includes immersing a second sensing terminal of a second ISFET in a reference solution. The working electrode, the counter electrode, the reference electrode, the first ISFET, and the second ISFET are included in a feedback electrode set. The method also includes applying, with an electronic controller, a first amount of current or voltage to the working electrode. The method further includes determining, with the electronic controller, a differential voltage between the first ISFET and the second ISFET. The method also includes determining, with the electronic controller, a difference between the differential voltage and a target voltage. The method also includes setting, with the electronic controller, a second amount of current or voltage to reduce the difference between the differential voltage and the target voltage. The method further includes applying, with the electronic controller, the second amount of current or voltage to the working electrode.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations, and explain various principles and advantages of those implementations.

Figure 1:
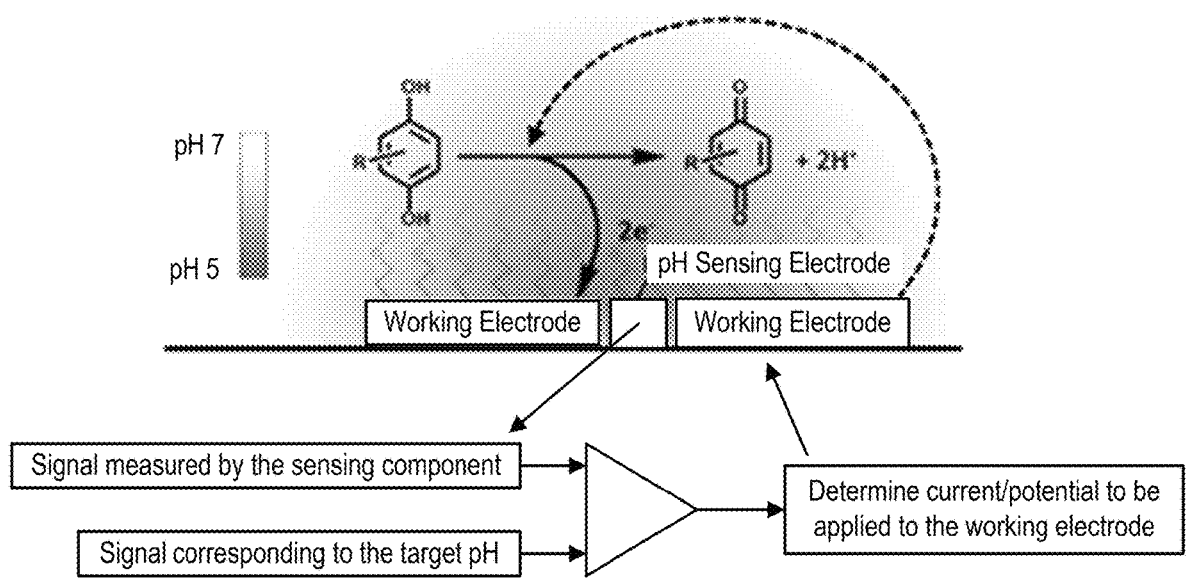
FIG. 1 is a schematic of an example of modulating pH of a solution via oxidation/reduction of redox active species with closed-loop control using surface-patterned electrodes, in accordance with some implementations.

The system and method components have been represented where appropriate by conventional symbols in the drawings, showing only those specific details that are pertinent to understanding the implementations so as not to obscure the disclosure with details that will be readily apparent to those of ordinary skill in the art having the benefit of the description herein.

DETAILED DESCRIPTION

FIG. 1 is a schematic illustrating an example of modulating pH of a solution via oxidation/reduction of redox active species with closed-loop control using surface-patterned electrodes. In FIG. 1, a pH sensing electrode measures initial pH values from which an amount of current or voltage to apply to a working electrode is determined. When the current or voltage is applied to the working electrode, electrochemical oxidation and/or reduction of pH modulation reagents (for example, quinones) introduces a local pH change through the equilibration between generation or consumption of protons and buffering capacity of the buffer solution. This local pH change generates a pH modulation zone with a very short vertical distance (for example, between several nanometers and several millimeters) from the surface of the electrode, which allows pH-dependent chemical/biochemical reactions to happen only within that volume. The size of the modulation zone is dependent in part on the buffering capacity of the solution. For example, the size of the modulation zone is tighter in stronger buffers. Monitoring actual pH during the modulation from the pH sensing electrode allows changes to the electrical output continuously through closed-loop control, which enables, among other things, a faster and more precise pH control. In some implementations, pH control is carried out in a non-buffered solution.

Figure 2:
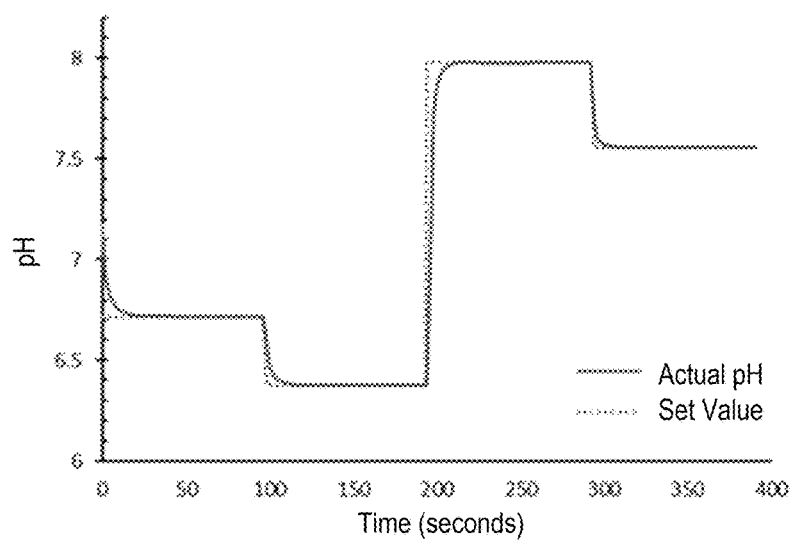
FIG. 2 is a graph of an example of the changing pH of a solution via oxidation/reduction of redox active species with closed-loop control.

Reversible electrochemical oxidation/reduction of pH modulation reagents such as quinone derivatives, hydrazine derivatives, or water have been demonstrated for a rapid pH change in a local region. The pH modulation limit depends on the pKa and oxidation/reduction potential of the specific pH modulation reagents, and their concentration. FIG. 2 is a graph illustrating an example of closed-loop control of pH modulation by the oxidation of 2,5-dimethyl-1,4-hydroquinone (DMHQ) and the reduction of the 2,5-dimethyl-1,4-benzoquinone (DMBQ) on an indium-tin oxide electrode in a 1 mM phosphate buffer. When anodic current is applied to the indium-tin oxide electrode, the proton production overcomes the buffer capacity and pH of the solution becomes more acidic and vice versa. The pH values illustrated in FIG. 2 were determined by a pre-calibrated iridium oxide sensing electrode patterned on the surface. As illustrated in FIG. 2, closed-loop control achieves the target pH values in an accurate and rapid manner.

Figure 3A:
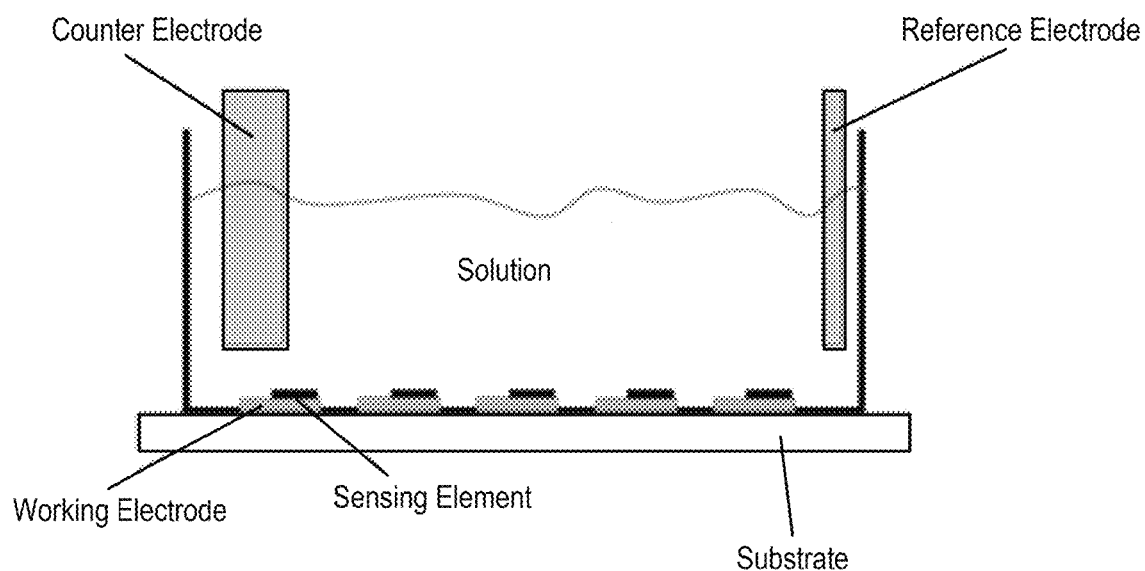
FIG. 3A is a diagram of an example of a pH control device with external counter and reference electrodes, in accordance with some implementations.
Figure 3B:
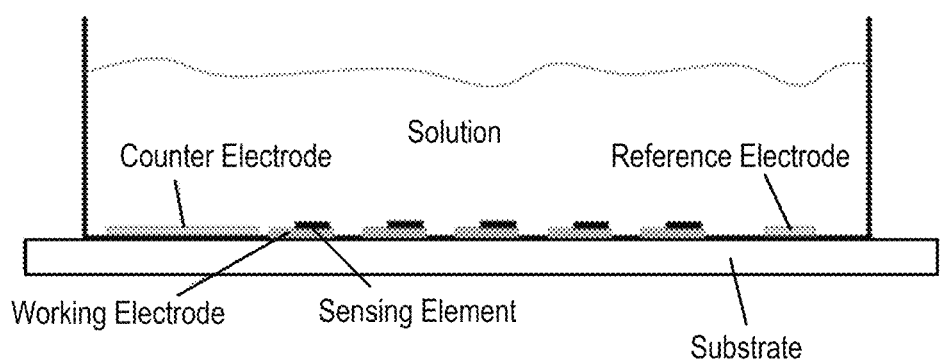
FIG. 3B is a diagram of an example of a pH control device with counter and reference electrodes positioned on a substrate, in accordance with some implementations.

Electrochemical pH modulation with closed-loop control uses a set of electrodes, for example, a working electrode, a sensing element, a counter electrode, and a reference electrode. The reference electrode provides a stable potential reference for measurement. In some implementations, when the sensing element has good stability and is placed in a stable pH solution, the sensing element is used as a reference electrode. Further, in some implementations, the counter and reference electrodes are shared for multiple working electrodes and sensing elements. In some implementations, external counter and reference electrodes are used. For example, FIG. 3A is a pH control device with external counter and reference electrodes. In other implementations, surface patterned on-chip counter and reference electrodes are used. For example, FIG. 3B is a pH control device with counter and reference electrodes positioned on a substrate.

Figure 4A:
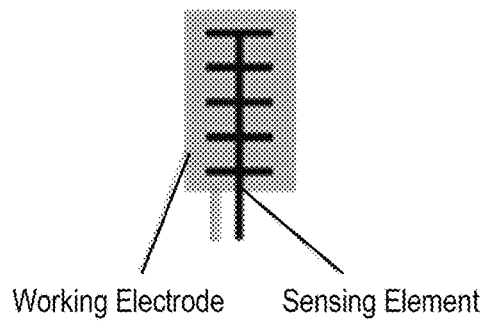
FIGS. 4A and 4B are top views of examples of differently-shaped pH control electrodes, in accordance with some implementations.
Figure 4B:
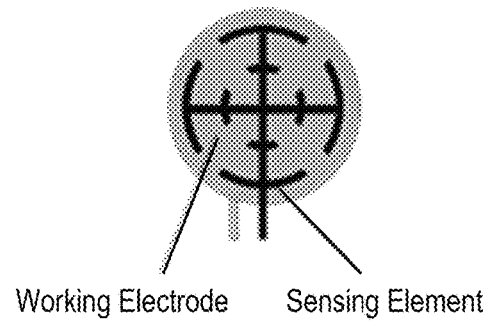
Figure 4C:
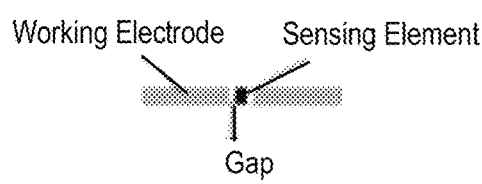
FIG. 4C is a side view of an example of a pH control electrode with a sensing element and a working electrode positioned on the same place, in accordance with some implementations.
Figure 4D:
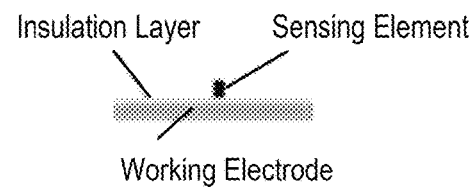
FIG. 4D is a side view of an example of a pH control electrode with a multi-layer stack, in accordance with some implementations.

Working electrode and sensing element can have various shapes and sizes. For example, FIGS. 4A and 4B are top views of differently-shaped pH control electrodes. The sensing element needs physical separation from the working electrode to avoid a crosstalk or shorting. In some implementations, the sensing element is positioned in the same plane as the working electrode with a small gap therebetween to provide physical separation. For example, FIG. 4C is a side-view of a pH control electrode with the sensing element and the working electrode positioned in the same plane. The gap between the sensing element and the working electrode may range from, for example, 1 nanometer to 100 microns. In other implementations, the sensing element is placed on top of the working electrode with an insulation layer therebetween to provide physical separation. For example, FIG. 4D is a side-view of a pH control electrode with a multi-layer stack.

Figure 4E:
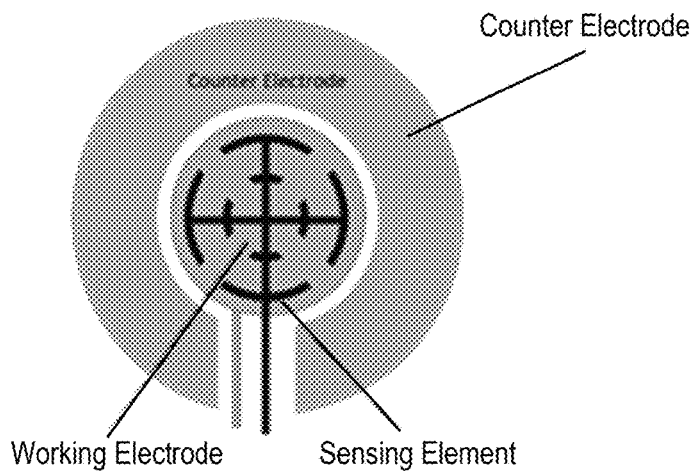
FIG. 4E is a top view of a pH control electrode with a counter electrode patterned around the working electrode, in accordance with some implementations.

In some implementations, the counter electrode is patterned around the working electrode, which minimizes the diffusion effect and helps controlling pH with a more definitive shape of the pH modulation zone, especially with non-buffered solutions. For example, FIG. 4E is a top view of a pH control electrode with a counter electrode patterned around the working electrode.

Figure 5A:
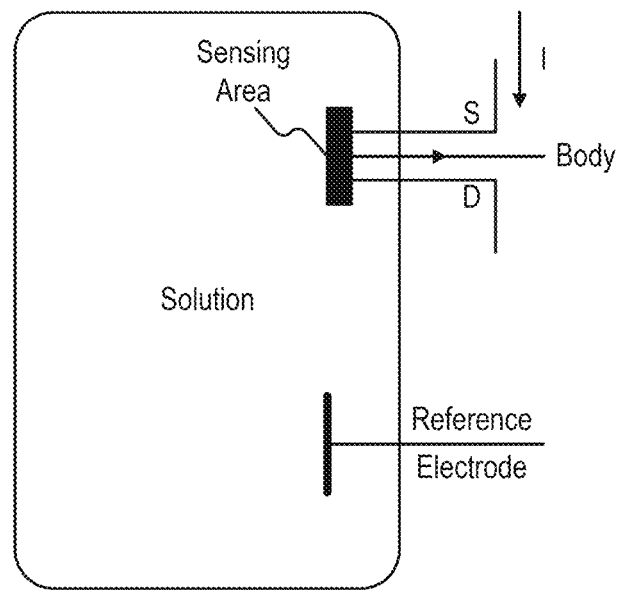
FIG. 5A is a diagram of an example of a p-channel ion-sensitive field-effect transistor (ISFET), in accordance with some implementations.
Figure 5B:
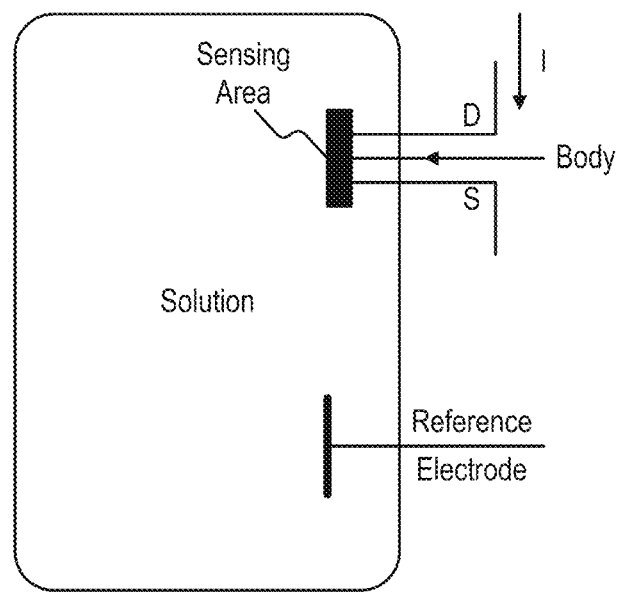
FIG. 5B is a diagram of an example of an n-channel ISFET, in accordance with some implementations.

The sensing element includes an ion-sensitive field-effect transistor (ISFET). An ISFET is a particular type of chemically-sensitive field-effect transistor (chemFET) that has sensitivity to the ion concentration in a solution. An ISFET is similar to a metal-oxide-semiconductor field-effect transistor (MOSFET) and has a source terminal (S), drain terminal (D), and a body (or bulk) connection. However, instead of a metal gate electrode, the ISFET has an ion-sensitive area immersed in a solution and a separate reference electrode. FIG. 5A is an example of a p-channel ISFET. FIG. 5B is an example of a n-channel ISFET. For the p-channel case, the electrical channel is formed mostly by holes and, when the device is on, most of the current is comprised of holes flowing through the channel. For the n-channel case, the electrical channel is formed by mostly electrons and, when the device is on, most of the current is comprised of electrons flowing through the channel. In both cases, the threshold voltage of the ISFET depends upon the ion concentration in the solution. The modulation of the threshold voltage in turn modulates the current passing through the ISFET and the voltage at either the source or drain terminals. The ISFET is configured to be sensitive to ions, for example hydrogen ions, and thus the pH of a solution.

Figure 6:
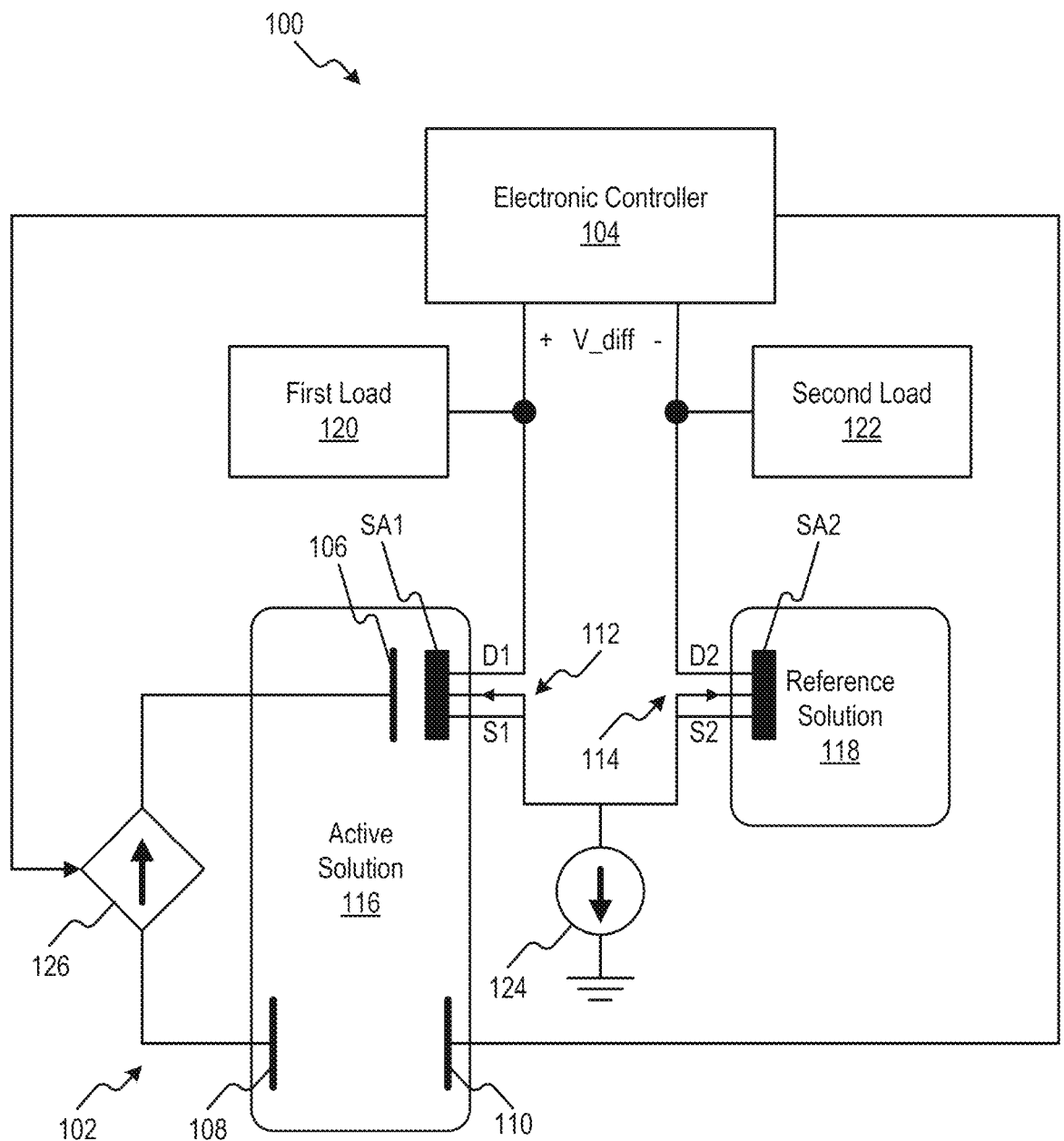
FIG. 6 is a diagram of an example of a closed-loop system for controlling pH, in accordance with some implementations.

FIG. 6 is a diagram on an example of closed-loop system 100 for controlling pH. In FIG. 6, multiple ISFETs are used in a differential fashion in order to read and control the ion concentration and pH in a closed-loop system. The closed-loop system 100 illustrated in FIG. 6 includes a feedback electrode set 102 and an electronic controller 104. The feedback electrode set 102 illustrated in FIG. 6 includes a working electrode 106, a counter electrode 108, a reference electrode 110, a first ISFET 112, and a second ISFET 114. The electrodes are composed of materials including, for example, metal oxide, glassy carbon, graphene, metal, gold, silver, platinum, conducting polymer, silver chloride, normal hydrogen, mercury drop, saturated calomel, or a combination thereof. In some implementations, the electrodes are patterned on a support including, for example, a glass slide, a plastic plate, a silicon wafer, a glass wafer, a quartz wafer, a flexible plastic sheet, a polymer layer, a paper, or a combination thereof.

A sensing area SA1 of the first ISFET 112 (an example of a "first sensing terminal") is immersed in an active solution 116. The active solution 116 includes, for example, a buffered solution, an unbuffered solution, an aqueous solution, an organic solution, or a combination thereof. The active solution 116 includes one or more redox active species including, for example, quinones, catechols, aminophenols, hydrazines, any derivative thereof, or any combination thereof. A sensing area SA2 of the second ISFET 114 (an example of a "second sensing terminal") is immersed in a reference solution 118. In some implementations, the active solution 116 is physically separate from the reference solution 118 to eliminate interface therebetween. For example, the active solution 116 and the reference solution 118 may be contained in separate containers. In other implementations, the active solution 116 is isolated from the reference solution 118 to minimize interference therebetween. For example, the active solution 116 and the reference solution 118 may be contained in separate containers that are connected through, for example, a channel that limits the interaction and interference between the two solutions. As a further example, the active solution 116 and the reference 118 solution may be contained within a single container but are sufficiently separated in distance such that they do not interfere with each other. In some implementations, the reference solution 118 remains at a desired pH level such that the output of the second ISFET 114 is consistent. The reference solution 118 can be allowed to drift naturally based on environmental effects or maintained (actively or passively) at a desired pH level.

Figure 7A:
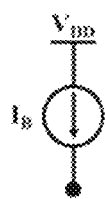
FIGS. 7A though 7E are diagrams of examples of loads, in accordance with some implementations.
Figure 7B:
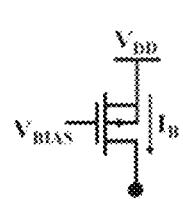
Figure 7C:
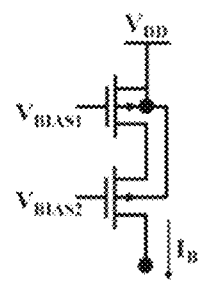
Figure 7D:
Figure 7E:
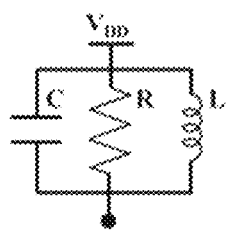

The drain terminal D1 of the first ISFET 112 is coupled to the electronic controller 104. The drain terminal D1 of the first ISFET 112 (an example of a "first drain terminal") is also coupled to a first load 120. The first load 120 can be used to bias the first ISFET 112 and/or facilitate a conversion from current to voltage. This configuration is similar to a common-source amplifier using MOSFETs. In some implementations, the first load 120 is coupled between the drain terminal D1 of the first ISFET 112 and a supply voltage (for example, VDD). In some implementations, the first load 120 includes a current source with a fixed current, as illustrated in FIG. 7A. In other implementations, the first load 120 includes a p-channel MOSFET acting as a current source, as illustrated in FIG. 7B. In other implementations, the first load 120 includes a cascaded p-channel MOSFET, as illustrated in FIG. 7C. In other implementations, the first load 120 includes a resistor as illustrated in FIG. 7D. In other implementations, the first load 120 includes a resonant circuit. For example, the first load 120 may include a capacitor, a resistor, and an inductor coupled in a parallel configuration, as illustrated in FIG. 7E. In other implementations, the first load 120 includes other combinations of transistors and/or passive elements.

The drain terminal D2 of the second ISFET 114 is coupled to the electronic controller 104. The drain terminal D2 of the second ISFET 114 (an example of a "second drain terminal") is also coupled to a second load 122. In some implementations, the second load 122 is coupled between the drain terminal of the second ISFET 114 and a supply voltage (for example, VDD). The second load 122 includes any of the types of load as described above for the first load 120. In some implementations, the second load 122 is the same type of load as the first load 120. For example, the first load 120 and the second load 122 may each include a single resistor.

The source terminal S1 of the first ISFET 112 (an example of a "first source terminal") is coupled to the source terminal S2 of the second ISFET 114 (an example of a "second source terminal"). In some implementations, the source terminal S1 of the first ISFET 112 and the source terminal S2 of the second ISFET 114 are coupled to a current source 124 for biasing as illustrated in FIG. 6. In other implementations, the source terminal S1 of the first ISFET 112 and the source terminal S2 of the second ISFET 114 are coupled to a reference terminal with a pseudo-differential configuration for biasing. In other implementations, the source terminal S1 of the first ISFET 112 and the source terminal S2 of the second ISFET 114 are coupled to a load impedance for biasing.

In some implementations, in order to increase device linearity and avoid the body effect, the body terminals of the first ISFET 112 and the second ISFET 114 are respectively coupled to the source terminals as illustrated in FIG. 6. In other implementations, the voltages at the body terminals are configured based on the other voltages in the closed-loop system 100 (for example, a reference terminal or a supply voltage) using a body control circuit.

Figure 8:
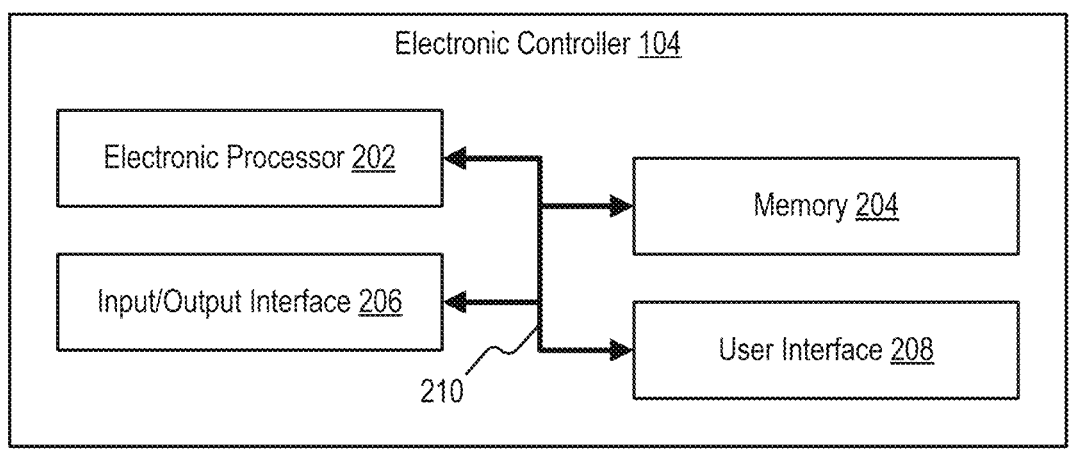
FIG. 8 is a block diagram of an example of an electronic controller, in accordance with some implementations.

FIG. 8 is a block diagram of one example of the electronic controller 104. The electronic controller 104 illustrated in FIG. 8 includes an electronic processor 202 (for example, one or more microprocessors, application-specific integrated circuits (ASICs), systems-on-a-chip (SoCs), or other electronic controllers), memory 204, an input/output interface 206, a user interface 208, and a bus 210. In some implementations, the electronic controller 104 includes fewer or additional components in configurations different from the one illustrated in FIG. 8. For example, in practice, the electronic controller 104 may include additional components such as one or more power supplies, one or more sensors, and the like. For ease of explanation, these additional components are not illustrated here.

The input/output interface 206 includes routines for transferring information between components within the electronic controller 104 and components external to the electronic controller 104. The input/output interface 206 is configured to transmit and receive data via one or more wired couplings (for example, wires, optical fiber, and the like), wirelessly, or a combination thereof.

The user interface 208 includes, for example, one or more input mechanisms (for example, a touch screen, a keypad, a button, a knob, and the like), one or more output mechanisms (for example, a display, a printer, a speaker, and the like), or a combination thereof. In some implementations, the user interface 208 includes a touch-sensitive interface (for example, a touch-screen display) that displays visual output generated by software applications executed by the electronic processor 202. Visual output includes, for example, graphical indicators, lights, colors, text, images, graphical user interfaces (GUIs), combinations of the foregoing, and the like. The touch-sensitive interface also receives user input using detected physical contact (for example, detected capacitance or resistance). In some implementations, the user interface 208 is separated from the electronic controller 104.

The bus 210 connects various components of the electronic controller 104 including, for example, the memory 204 to the electronic processor 202. The memory 204 includes, for example, read only memory (ROM), random access memory (RAM), an electrically erasable programmable read-only memory (EEPROM), other non-transitory computer-readable media, or a combination thereof. In some implementations, the memory 204 is included in the electronic processor 202. The electronic processor 202 is configured to retrieve computer-readable instructions and data from the memory 204 and execute the computer-readable instructions to perform the functionality described herein.

The first ISFET 112 illustrated in FIG. 6 detects ion concentrations in the active solution 116 close to its sensing area SA1 and outputs a voltage to the electronic controller 104 via its drain terminal D1. The second ISFET 114 illustrated in FIG. 6 detects ion concentrations in the reference solution 118 close to its sensing area SA2 and outputs a voltage to the electronic controller 104 via its drain terminal D2. The electronic controller 104 is configured to determine a differential voltage between the first ISFET 112 and the second ISFET 114. In some implementations, the electronic controller 104 determines a differential voltage between the drain terminal D1 of the first ISFET 112 and the drain terminal D2 of the second ISFET 114. The differential voltage reduces (or cancels) systematic drift or interference caused, for example, by temperature variations, time variations, and coupling from other nodes in the closed-loop system 100 (for example, supply or clock nodes).

The working electrode 106 is positioned close to the sensing area SA1 in the active solution 116. The electronic controller 104 is also configured to apply a current or a voltage to the working electrode 106 in order to adjust the ion concentration (and the pH) close to the sensing area SA1 in the active solution 116. In some implementations, electrical current or voltage is applied to the working electrode 106 galvanostatically or potentiostatically. In FIG. 6, the electronic controller 104 applies a current to the working electrode 106 via a current source 126 that is coupled between the working electrode 106 and the counter electrode 108. The current source 126 supplies a positive current to increase the concentration of hydrogen ions and decrease the pH close to the sensing area of the first ISFET 112. The current source 126 also supplies a negative current to reduce the concentration of hydrogen ions and increase the pH close to the sensing area of the first ISFET 112. In FIG. 6, the current source 126 is separate from the electronic controller 104 and the electronic controller 104 is configured to generate analog or digital signals which set the output current of the current source 126. In other implementations, the current source 126 is included in the electronic controller 104. In other implementations, the electronic controller 104 applies a voltage between the counter electrode 108 and the working electrode 106 via an external or internal voltage source.

The electronic controller 104 sets the current or voltage to apply to the working electrode 106 in order to reduce the difference between the differential voltage and a target voltage. In some implementations, the electronic controller 104 determines the target voltage based on a reference voltage measured by the reference electrode 110. For example, the target voltage may be substantially equal to the reference voltage from the reference electrode 110. In other implementations, the target voltage is fixed at a predetermined value or is set dynamically based on other parameters of the closed-loop system 100.

In the closed-loop system 100, the output of first ISFET 112 is used to sense the pH and the electronic controller 104 actively adjusts the current or voltage to increase or decrease the pH to a desired level. The current or voltage can be adjusted to higher values to quickly bring the pH to a desired value in response to the difference between the target pH value and the actual measured pH or a solution disturbance. The current or voltage can also maintain a constant pH through a fine adjustment for a long-term period.

Figure 9:
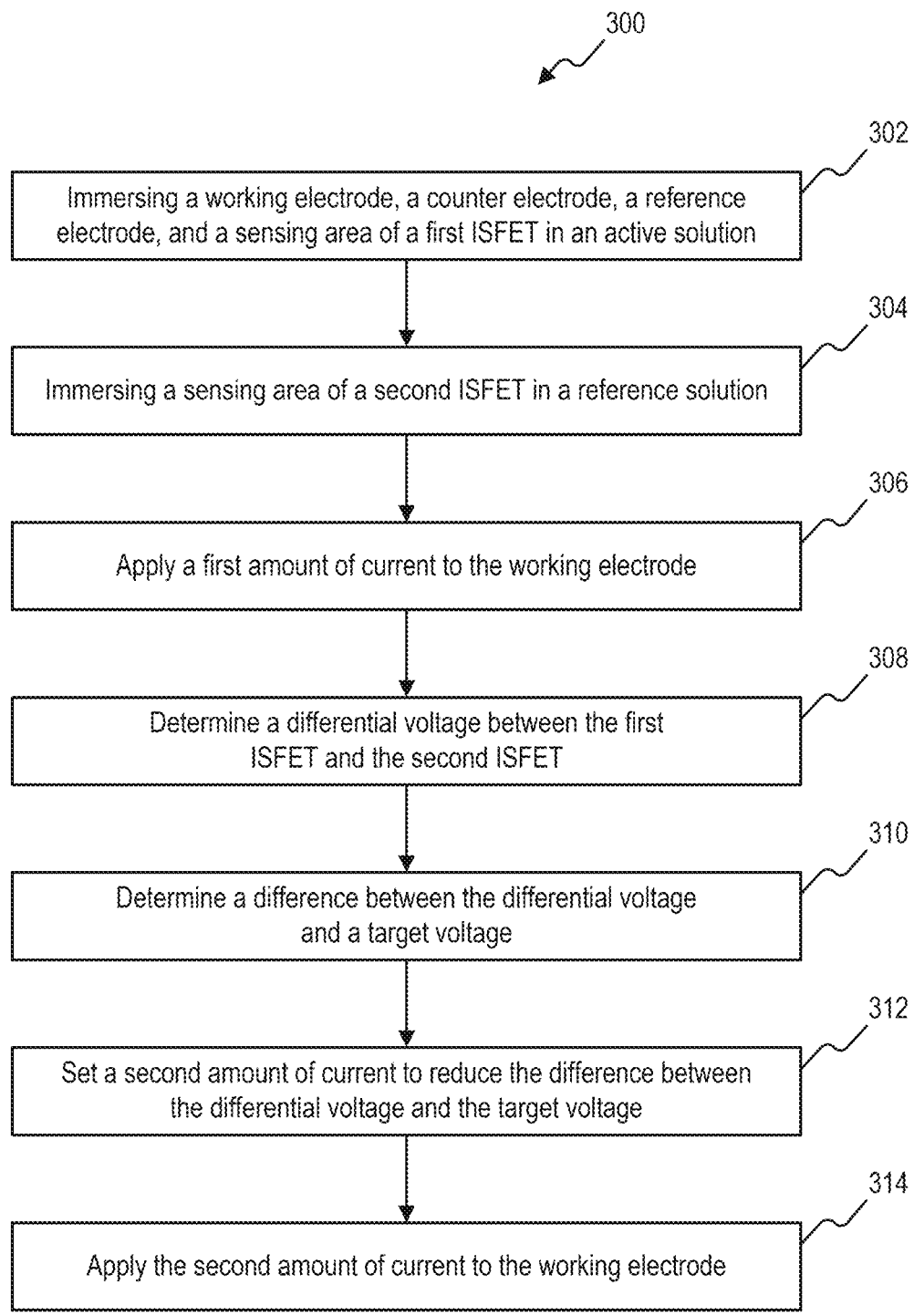
FIG. 9 is a flow diagram of an example of a method for controlling pH, in accordance with some implementations.

FIG. 9 is a flow diagram of one example of a closed-loop method 300 for controlling pH. At block 302, the working electrode 106, the counter electrode 108, the reference electrode 110, and the sensing area SA1 of the first ISFET 112 are immersed in the active solution 116. At block 304, the sensing area SA2 of the second ISFET 114 is immersed in the reference solution 118. At block 306, a first amount of current is applied to the working electrode 106. For example, the electronic controller 104 generates and sends signals to the current source 126 which causes the current source 126 to apply the first amount of current to the working electrode 106. At block 308, a differential voltage between the first ISFET 112 and the second ISFET 114 is determined (for example, by the electronic controller 104). In some implementations, the differential voltage between the first ISFET 112 and the second ISFET 114 is the differential voltage between the drain terminal D1 of the first ISFET 112 and the drain terminal D2 of the second ISFET 114. At block 310, a difference between the differential voltage and a target voltage is determined (for example, by the electronic controller 104). At block 312, a second amount of current are set to reduce the difference between the differential voltage and the target voltage. As a first example, the electronic controller 104 sets a second amount of current that is higher than the first amount of current when the differential voltage is less than the target voltage. As a second example, the electronic controller 104 sets a second amount of current that is lower than the first amount of current when the differential voltage is greater than the target voltage. At block 314, the second amount of current is applied to the working electrode 106. For example, the electronic controller 104 generates and sends signals to the current source 126 which causes the current source 126 to apply the second amount of current to the working electrode 106. In some implementations, the method 300 returns to block 308 after block 314 for continuous pH control. For example, the electronic controller 104 determines a new (or updated) differential voltage between the first ISFET 112 and the second ISFET 114 resulting from the second amount of current applied to the working electrode 106.

Figure 10:
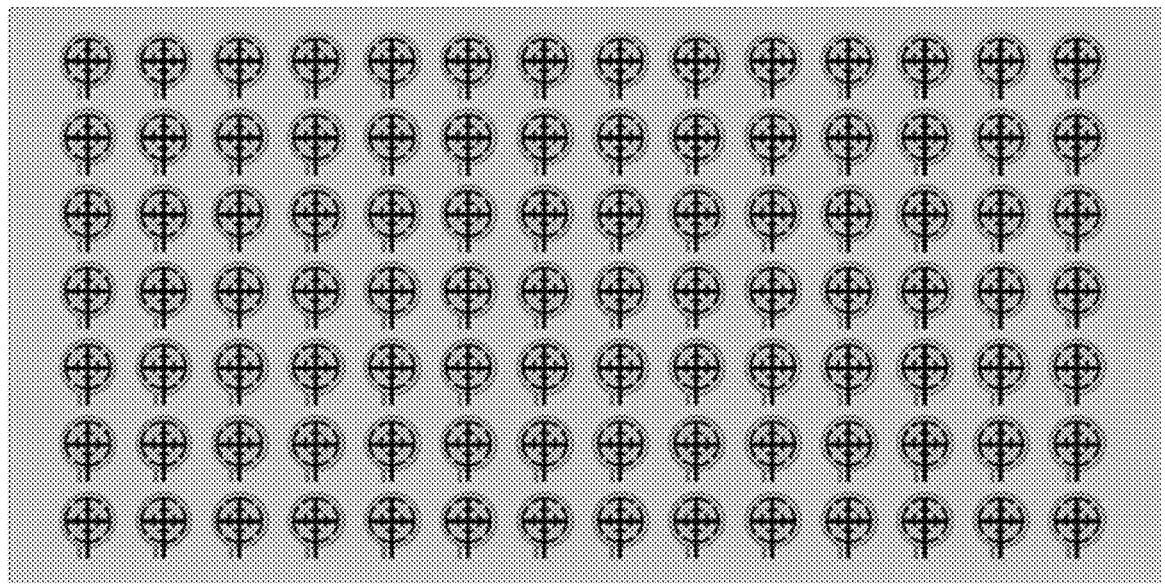
FIG. 10 is a diagram of an example of an array of feedback electrode sets, in accordance with some implementations.

In some implementations, the feedback electrode sets 102 in one of a plurality of feedback electrode sets arranged in an array. FIG. 10 is an example of an array of feedback electrodes sets. In some implementations, the array includes fewer or additional components in configurations different from the one illustrated in FIG. 10. For example, in practice, the array may include additional components such as connecting electrodes, contact pads, and the like. For ease of illustration, these additional components are not shown here. In some implementations, the counter electrode 108 and/or the reference electrode 110 are shared by multiple feedback electrode sets.

Figure 11:
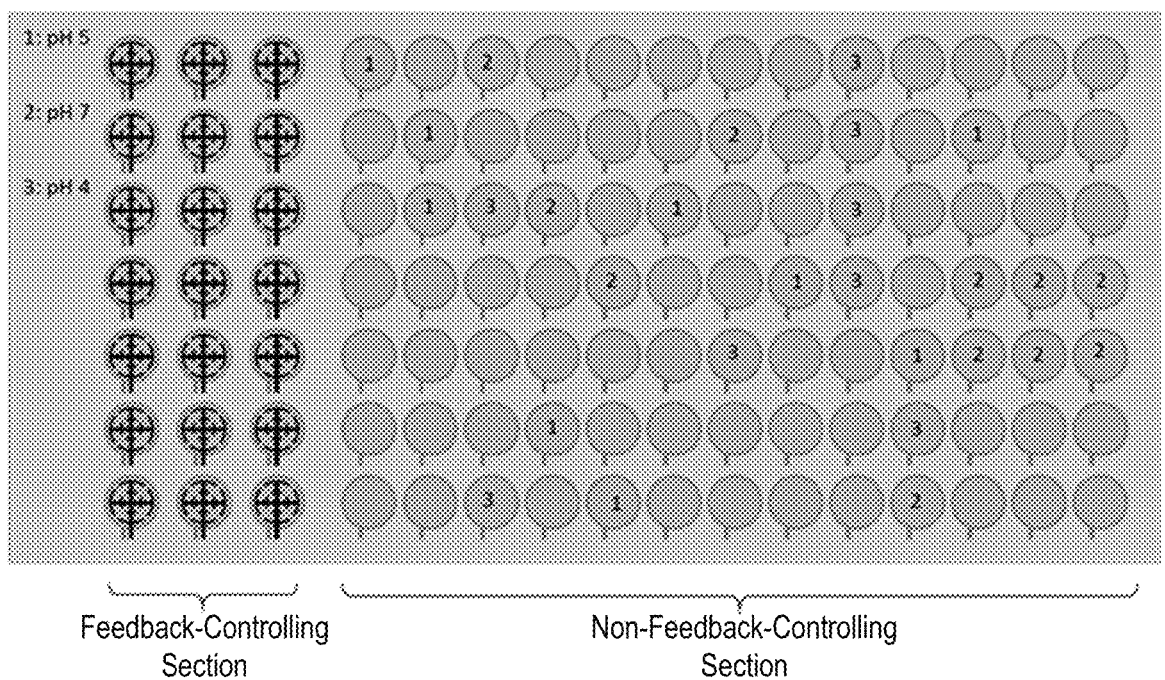
FIG. 11 is a diagram of an example of an array of feedback and non-feedback electrodes sets arranged in different sections, in accordance with some implementations.

In some implementations, the array also includes non-feedback electrode sets. FIG. 11 is an example of an array including feedback electrode sets and non-feedback electrode sets. Each of the non-feedback electrode sets includes a working electrode 106. In some implementations, each of the non-feedback electrode sets further includes a counter electrode 108 and a reference electrode 110. The feedback electrode sets are used to identify electrical parameters to achieve one or more target pHs for each round through a feedback controlling scheme. The identified electrical parameters are applied to the non-feedback electrode sets. For example, each feedback electrode set targets independent pH values. For each target pH value, there are one or more non-feedback electrode sets that are also assigned to the same pH target. Since the shape and size of the working electrodes 106 are similar, electrical parameters obtained from the feedback electrode sets can be directly applied to the working electrodes 106 in the non-feedback electrode sets. This control scheme is useful, for example, for carrying out multiple rounds of steps of reactions or visualization such as making a library array of polymers including peptides and nucleic acids.

Figure 12:
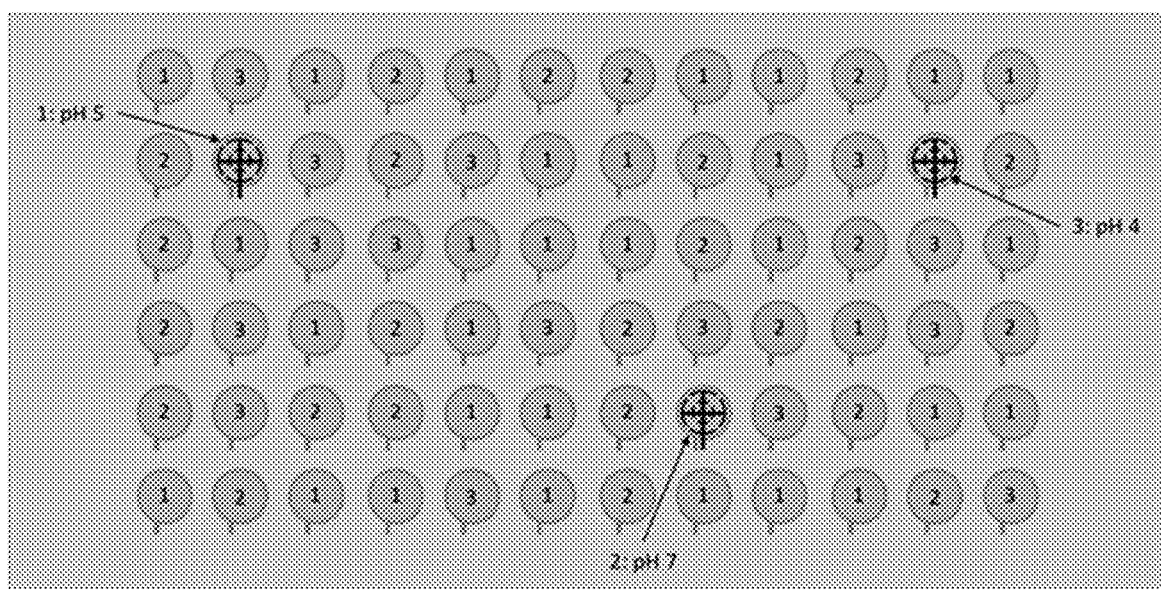
FIG. 12 is a diagram of an example of an array of feedback and non-feedback electrodes sets interspersed with each other, in accordance with some implementations.

In some implementations, the feedback electrode sets and the non-feedback electrode sets are positioned in different sections of the array. For example, in FIG. 11, the feedback electrode sets are positioned in a feedback controlling section and the non-feedback electrode sets are positioned in a non-feedback controlling positions. In other implementations, the feedback electrode sets are distributed throughout the array, surrounded by non-feedback electrodes sets as illustrated in FIG. 12. The implementation illustrated in FIG. 12 helps minimize the influence of the pH control from the adjacent electrode sets. Since the feedback electrode sets are surrounded by the non-feedback electrode sets with various target pHs, the electrical parameters are chosen to overcome the effect, if any, from neighboring electrodes by averaging the impact from various pH values.

In some implementations, the active solution comprises a pH modulation reagent and an analyte labeled with a pH-sensitive label, and a pH modulation zone is formed near a surface of the working electrode as a result of a pH controlling process as described herein. In some implementations, the pH-sensitive label of the analyte in the pH modulation zone produces a signal. The presence and intensity of the signal may change in response to the pH value in the pH modulation zone. In some implementations, the present method further comprises detecting the signal produced by the pH-sensitive label in the pH modulation zone.

In particular implementations, the present disclosure provides an analytical method, which comprises:
(a) immersing the feedback electrode set of the closed-loop system as described herein in a solution comprising a pH modulation reagent and an analyte labeled with a pH-sensitive label;

(b) performing a process by the electronic controller, the process comprising:
(b1) measuring an output sensing value from the first sensing terminal;
(b2) determining a difference between the output sensing value and a target sensing value; and
(b3) applying an amount of current or voltage to the working electrode to reduce the difference between the output sensing value and target sensing value;
whereby the process (b) forms a pH modulation zone near a surface of the working electrode;
wherein the pH-sensitive label of the analyte in the pH modulation zone produces a signal; and
(c) detecting the signal produced by the pH-sensitive label in the pH modulation zone.

The pH modulation agent refers to a compound or a composition that undergoes a chemical reaction in a solution in response to electrical potentials or currents thereby causing a change in the pH value of the solution. The chemical reaction may be a redox reaction, in which the redox state of the pH modulating agent is changed. Electrochemical oxidation and/or reduction of the pH modulating agents via electrical stimulus may introduce local pH change through the equilibration between generation or consumption of protons and buffering capacity of the buffer solution. This may generate a pH modulation zone with a very short vertical distance, for example from several nm to several µm, from the surface of the electrode. In some implementations, the pH modulation agents may include materials that can perform proton coupled electron transfer. Suitable pH modulating agents include, but are not limited to quinone derivatives, aminophenol derivatives, aniline derivatives, benzidine derivatives, hydrazine derivatives, phenol-Ru(2, 2'-bipyridine)$_3^{2+}$, and combinations thereof. Suitable pH modulating agents may also include other known compounds having pH-responding moieties not exemplified above.

In some implementations, the pH modulating agent is a quinone derivative of any of formula (I)-(XII)

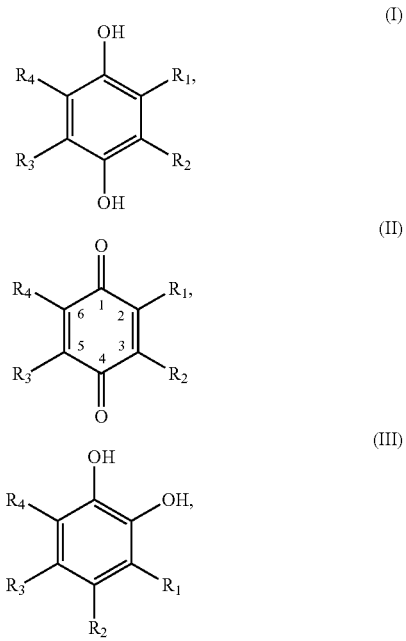

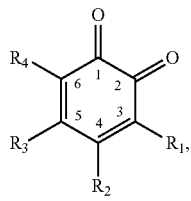
(IV)

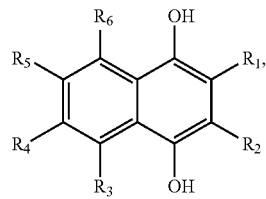
(V)

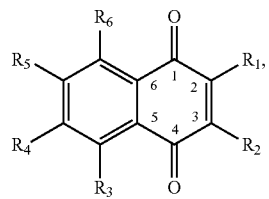
(VI)

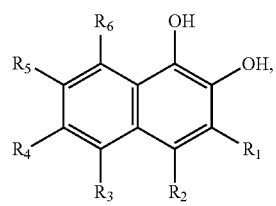
(VII)

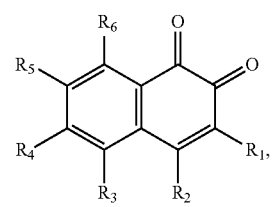
(VIII)

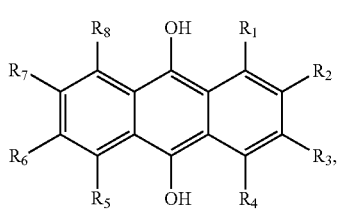
(IX)

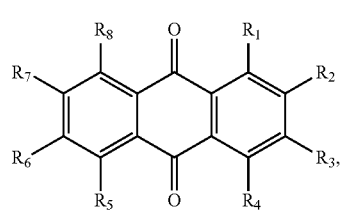
(X)

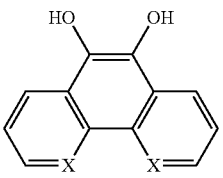
X = C or N
(XI)

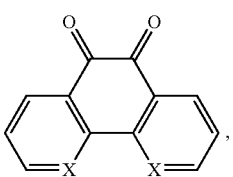
X = C or N
(XII)

wherein $R_1$, $R_2$, $R_3$, $R_4$, $R_5$, $R_6$, $R_7$, and $R_8$ are each independently selected from the group consisting of: H; $C_nH_{2n+1}$; Cl; F; I, Br, OM, $NO_2$, OH, $OC_nH_{2n+1}$, $OC_nH_{2n}OH$, $O(C_nH_{2n}O)_yH$, $O(C_nH_{2n}O)_yC_nH_{2n+1}$, $O(C_nH_{2n}O)_yCOOH$; $O(C_nH_{2n}O)_yCOOM$; COOH; COOM; $COOC_nH_{2n+1}$; $CONHC_nH_{2n+1}$; $CON(C_nH_{2n+1})_2$; $SO_3H$; $SO_3M$; $NH_2$; $NHC_nH_{2n+1}$; $N(C_nH_{2n+1})_2$; $NHC_nH_{2n}OH$; $NHC_nH_{2n}NH_2$; $N(C_nH_{2n}OH)_2$; $N(C_nH_{2n}NH_2)_2$; $NHCOC_nH_{2n+1}$; $NC_nH_{2n}COC_nH_{2n+1}$; $NC_nH_{2n}COC_nH_{2n}OH$; $NC_nH_{2n}COC_nH_{2n}NH_2$; $NHC_nH_{2n}COC_nH_{2n}SH$; SH; $SC_nH_{2n+1}$; $SC_nH_{2n}OH$; $S(C_nH_{2n}O)_yH$; $S(C_nH_{2n}O)_yC_nH_{2n+1}$; $S(C_nH_{2n}O)_yCOOH$; $S(C_nH_{2n}O)_yCOOM$; $OC_nH_{2n}SH$; $O(C_nH_{2n}O)_ySH$; $O(C_nH_{2n}O)_yC_nH_{2n}SC_nH_{2n+1}$; $C_nH_{2n}OC_nH_{2n+1}$; $C_nH_{2n}SC_nH_{2n+1}$; $C_nH_{2n}NHC_nH_{2n+1}$; $C_nH_{2n}OH$; $C_nH_{2n}OC_nH_{2n+1}$; $C_nH_{2n}OC_nH_{2n}OH$; $C_nH_{2n}O(C_nH_{2n}O)_yCOOH$; $C_nH_{2n}O(C_nH_{2n}O)_yCOOM$; $C_nH_{2n}COOH$; $C_nH_{2n}COOM$; $C_nH_{2n}COOC_nH_{2n+1}$; $C_nH_{2n}CONHC_nH_{2n+1}$; $C_nH_{2n}CONH(C_nH_{2n+1})_2$; $C_nH_{2n}SO_3H$; $C_nH_{2n}SO_3M$; $C_nH_{2n}NH_2$; $C_nH_{2n}N(C_nH_{2n+1})_2$; $C_nH_{2n}NHC_nH_{2n}OH$; $C_nH_{2n}NHC_nH_{2n}NH_2$; $C_nH_{2n}N(C_nH_{2n}OH)_2$; $C_nH_{2n}N(C_nH_{2n}NH_2)_2$; $C_nH_{2n}NHCOC_nH_{2n+1}$; $C_nH_{2n}NHC_nH_{2n}COC_nH_{2n}OH$; $C_nH_{2n}NHC_nH_{2n}COC_nH_{2n}NH_2$; $C_nH_{2n}NHC_nH_{2n}COC_nH_{2n}SH$; $C_nH_{2n}SH$; $C_nH_{2n}SC_nH_{2n+1}$; $C_nH_{2n}SC_nH_{2n}OH$; $C_nH_{2n}S(C_nH_{2n}O)_yH$; $C_nH_{2n}S(C_nH_{2n}O)_yC_nH_{2n+1}$; $C_nH_{2n}S(C_nH_{2n}O)_yC_nH_{2n}COOH$; $C_nH_{2n}S(C_nH_{2n}O)_yC_nH_{2n}COOM$; sugars; peptides; and amino acids, wherein M is any metal cation or $NH_4^+$, n is an integer from 1 to $10^9$, and y is an integer from 1 to $10^9$.

In some implementations, $R_1$, $R_2$, $R_3$, $R_4$, $R_5$, $R_6$, $R_7$, and $R_8$ are each independently selected from the group consisting of $C_nH_{2n+1}$; $C_nH_{2n}OH$; $C_nH_{2n}OC_nH_{2n}OH$; $C_nH_{2n}O(C_nH_{2n}O)_yCOOH$; $C_nH_{2n}O(C_nH_{2n}O)_yCOOM$; $C_nH_{2n}COOH$; $C_nH_{2n}COOM$; $C_nH_{2n}COOC_nH_{2n+1}$; $C_nH_{2n}CONHC_nH_{2n+1}$; $C_nH_{2n}CONH(C_nH_{2n+1})_2$; $C_nH_{2n}SO_3H$; $C_nH_{2n}SO_3M$; $C_nH_{2n}NH_2$; $C_nH_{2n}NHC_nH_{2n+1}$; $C_nH_{2n}N(C_nH_{2n+1})_2$; $C_nH_{2n}NHC_nH_{2n}OH$; $C_nH_{2n}NHC_nH_{2n}NH_2$; $C_nH_{2n}N(C_nH_{2n}OH)_2$; $C_nH_{2n}N(C_nH_{2n}NH_2)_2$; $C_nH_{2n}NHCOC_nH_{2n+1}$;

$C_nH_{2n}NHC_nH_{2n}COC_nH_{2n}OH$;
$C_nH_{2n}NHC_nH_{2n}COC_nH_{2n}NH_2$;
$C_nH_{2n}NHC_nH_{2n}COC_nH_{2n}SH$; $C_nH_{2n}SH$; $C_nH_{2n}SC_nH_{2n}OH$;
$C_nH_{2n}S(C_nH_{2n}O)_yH$; $C_nH_{2n}S(C_nH_{2n}O)_yC_nH_{2n+1}$; $C_nH_{2n}S(C_nH_{2n}O)_yC_nH_{2n}COOH$; and $C_nH_{2n}S(C_nH_{2n}O)_yC_nH_{2n}COOM$.

Suitable quinone derivatives may contain various functional groups to tune their solubility, biocompatibility, and electrochemical properties. Other examples of suitable quinone derivatives include those described in U.S. Pat. Nos. 9,766,197, 9,874,538, 9,910,008, U.S. Ser. No. 10/011,549, U.S. Ser. No. 10/041,905, US20170010238, and WO2017005587 (PCT/EP2016/065252), the entire contents of which are incorporated herein by reference.

The analyte may be a synthetic or natural molecule, a biospecimen, a chemical complex, or a combination thereof. In some implementations, the analyte is a synthetic or natural small molecule (for example, M.W. 500 Da or less), a polymer, or a biomolecule such as protein, polypeptide, DNA, RNA, and lipid. In some implementations, the analyte is a biospecimen, such as a fixed tissue, cells such as fixed cells and live cells, extracellular vesicles, or combinations thereof. In some implementations, the analyte is a chemical complex, such as a metal chelate or a complex of biomolecules (for example, protein-protein complex, protein-ligand complex, protein-antibody complex, or protein-DNA complex). A complex of biomolecules may have two, three, four, five, six, seven, or eight biomolecules as components, and the complex may be formed by affinity binding and/or conjugation between individual components.

The analyte may be labeled with the pH-sensitive label by a chemical bond or attachment. The term "chemically bonding" or "chemically attaching" as used herein refers to forming a chemical bond between two substances. The chemical bond may be an ionic bond, a covalent bond, dipole-dipole interaction, or hydrogen bond. In some implementations, the analyte is a biomolecule chemically attached to a pH-sensitive label. In some implementations, the analyte includes a protein or peptide chemically attached to a pH-sensitive label. For example, the analyte may be a protein or peptide attached to a pH-sensitive label via a covalent bond.

The pH-sensitive label disclosed herein includes any agent that produces a detectable signal, in particular an optical signal, directly or indirectly, in response to a change of pH value. Suitable pH-sensitive labels include, but are not limited to, a fluorescent dye, a fluorescent protein, an enzyme, and combinations thereof. The analyte may be labeled by the pH-sensitive label using methods known in the art. In some implementations, the labeling methods may include the use of known labeled detection agents such as antibodies, DNA, RNA, aptamers, peptides, lipids, and small molecules. The labeling may include directly attaching a pH sensitive label to the analyte. Alternatively, the analyte may be indirectly labeled. For example, the labeling may include attaching a pH sensitive label to a detection agent which is attached to the analyte. In some implementations, the analyte is a biomolecule, which is directly or indirectly labeled with a pH-sensitive label. In some implementations, the labeling methods may include chemical modification through a functional group, such as methoxy- or ethoxy-, acetoxy-, and trichlorosilane, primary or secondary amine, NHS ester, maleimide, azides, or thiol.

In some implementations, the pH-sensitive label is a pH-sensitive fluorescent dye. Suitable fluorescent dyes include, but are not limited to pHrodo, Protonex, Oregon Green, LysoSensor Green, pHAb, fluorescein, FAM, rhodamine B derivatives, and SNARF.

Suitable fluorescent proteins include, but are not limited to green fluorescent protein, yellow fluorescent protein, and cyan fluorescent protein. In some implementations, the fluorescent protein is green fluorescent protein (GFP) and its mutants (eGFP).

Suitable enzymes useful as pH-sensitive labels include, but are not limited to, horseradish peroxidase (HRP), glucose oxidase, and alkaline phosphatase.

The solution may be buffered or non-buffered. The buffered solution refers to an aqueous or organic solution that may maintain its pH value at a nearly constant level and does not interfere with the operation of the imaging instruments. In some implementations, the buffered solution is an aqueous solution, such as phosphate buffer, citrate buffer, acetate buffer, or other buffers used in biological applications. In some implementations, the buffered solution is a solution in which the biological functions of the biospecimen may be detected or monitored. For example, the buffered solution may be a medium for cell culture. In some implementations, the analyte is contained in a sample of a human body fluid (such as blood, serum, saliva, urine, or sweat), a consumable product (such as milk, food, or drinking water), an industrial liquid, or natural resource (such as lake, river, or sea water). The sample may be added to a buffered solution before the method as described herein is carried out.

In some implementations, the optical signal produced by the pH sensitive label is a colorimetric signal such as change of color, a chemiluminescent signal such as chemiluminescence emission, or a fluorescent signal such as fluorescence emission. The production and strength of the optical signal may depend on the amount of the pH-sensitive labels being detected. In some implementations, the optical signal is fluorescence emission from the pH-sensitive labels in response to the pH modulation, which may be detected by a fluorescence microscope known in the art. In particular implementations, the optical signal may also refer to the difference between the detected optical output (for example, fluorescence intensities) at various stages of the present method. For example, the optical signal may refer to the change in fluorescence intensity detected before and after a potential or current is applied to the electrode as disclosed herein.

The intensity of the detected signal (for example, magnitude of fluorescent emissions) produced by the pH-sensitive label of the labeled analyte in the pH modulation zone may correlate with the presence and the quantity of the analyte in the solution. For example, a standard curve may be calculated using the signals obtained from standard solutions with known concentrations of the analyte, which may then be used to determine the concentration of the analyte in unknown samples. The present method may further comprise quantitating the concentration of the analyte in the solution using the intensity of the detected signal.

In some implementations, the surface of the working electrode may comprise a capture agent. The capture agent may be coated onto the surface or chemically attached to the surface. The capture agent may be a small molecule, a biomolecule (for example, a protein, an antibody, a peptide, or a nucleic acid) or a complex of biomolecules. The analyte may be coupled to the capture agent through affinity binding or chemical attachment. As a result, the analyte is immobilized near the surface of the working electrode.

The method described herein may be used for detecting an analyte in various chemical and biological assays, such as immunoassays and other types of assays based on protein-protein interaction. In particular implementations, an enzyme-linked immunosorbent assay (ELISA) may be carried out by the present method. For example, for detecting a target protein in a solution, an antibody may be attached to the surface of the working electrode as a capture agent (for example, by ssDNA spotting on the surface and subsequent antibody-oligonucleotide conjugation). The solution includes a pH modulation reagent (for example, 2,5-dimethyl-1,4-hydroquinone), and a pH modulation zone is formed as described herein. The target protein is immobilized near the surface of the working electrode through binding to the capture agent. Subsequent binding of a detection antibody and pH-sensitive label (for example, a fluorescent dye), directly or indirectly, to the target protein forms a protein complex as an analyte, which may be detected by measuring the signal produced by the label (for example, fluorescence imaging).

In one examples of ELISA, spots of the capture antibody are prepared on the surface of the working electrode, which is incubated with a buffer solution containing the target protein, detection antibody labeled with biotin, streptavidin-labeled with pHAb, and 2,5-dimethyl-1,4-hydroquinone and 2,5-dimethylbenzoquinone as the pH modulation reagents. pH modulation and control are carried out according to the method described herein, and fluorescence imaging is performed to detect the signal produced by the labeled target protein.

Various aspects of the disclosure may take any one or more of the following exemplary configurations.

EEE(1) A closed-loop system for controlling pH including, in some implementations, a feedback electrode set and an electronic controller. The feedback electrode set includes a working electrode, a counter electrode, a reference electrode, a first ion-sensitive field-effect transistor (ISFET), and a second ISFET. The working electrode, the counter electrode, and the reference electrode are immersible in an active solution. The first ISFET includes a first sensing terminal that is immersible in the active solution. The second ISFET includes a second sensing terminal that is immersible in a reference solution. The electronic controller is coupled to the feedback electrode set. The electronic controller is configured to apply a first amount of current or voltage to the working electrode. The electronic controller is also configured to determine a differential voltage between the first ISFET and the second ISFET. The electronic controller is further configured to determine a difference between the differential voltage and a target voltage. The electronic controller is also configured to set a second amount of current or voltage to reduce the difference between the differential voltage and the target voltage. The electronic controller is further configured to apply the second amount of current or voltage to the working electrode.

EEE(2) The closed-loop system of EEE(1), wherein the electronic controller is coupled to a first drain terminal of the first ISFET and to a second drain terminal of the second ISFET, and wherein, to determine the differential voltage between the first ISFET and the second ISFET, the electronic controller is further configured to determine the differential voltage between the first drain terminal and the second drain terminal.

EEE(3) The closed-loop system of EEE(1) or EEE(2), wherein a first source terminal of the first ISFET is coupled to a second source terminal of the second ISFET, and wherein the first source terminal and the second source terminal are biased using at least one selected from the group consisting of a current source, a reference terminal with a pseudo-differential configuration, and a load impedance.

EEE(4) The closed-loop system of EEE(2), wherein the first drain terminal is coupled to a first load, and wherein the second drain terminal is coupled to a second load.

EEE(5) The closed-loop system of EEE(4), wherein the first load includes at least one selected from the group consisting of a fixed current source, a p-channel metal-oxide-semiconductor field-effect transistor (MOSFET), a cascaded p-channel MOSFET, a resistor, and a resonant circuit.

EEE(6) The closed-loop system of any one of EEE(1) to EEE(5), wherein the active solution is physically separate from the reference solution.

EEE(7) The closed-loop system of any one of EEE(1) to EEE(5), wherein the active solution is isolated from the reference solution.

EEE(8) The closed-loop system of any one of EEE(1) to EEE(7), wherein the electronic controller is further configured to: measure a reference voltage from the reference electrode, and determine the target voltage based at least in part on the reference voltage EEE(9) The closed-loop system of any one of EEE(1) to EEE(8), wherein the working electrode and the counter electrode are coupled to a current or voltage source, and wherein the electronic controller is further configured to apply the first amount of current or voltage and the second amount of current or voltage via the current or voltage source.

EEE(10) The closed-loop system of any one of EEE(1) to EEE(9), wherein the feedback electrode set is one of a plurality of feedback electrode sets arranged in an array.

EEE(11) The closed-loop system of EEE(10), further including a plurality of non-feedback electrode sets arranged in the array, wherein each of the plurality of non-feedback electrode sets including the working electrode and the counter electrode.

EEE(12) The closed-loop system of EEE(1), wherein the plurality of feedback electrode sets and the plurality of non-feedback electrode sets are positioned in different sections of the array.

EEE(13) The closed-loop method of EEE(1), wherein the working electrode is a first working electrode, wherein the closed-loop system further comprises a non-feedback electrode set including a second working electrode immersible in the active solution, and wherein the electronic controller is further configured to apply the second amount of current or voltage to the second working electrode.

EEE(14) A closed-loop method for controlling pH including immersing a working electrode, a counter electrode, a reference electrode, and a first sensing terminal of a first ion-sensitive field-effect transistor (ISFET) in an active solution. The closed-loop method also includes immersing a second sensing terminal of a second ISFET in a reference solution. The working electrode, the counter electrode, the reference electrode, the first ISFET, and the second ISFET are included in a feedback electrode set. The closed-loop method also includes applying, with an electronic controller, a first amount of current or voltage to the working electrode. The closed-loop method further includes determining, with the electronic controller, a differential voltage between the first ISFET and the second ISFET. The closed-loop method also includes determining, with the electronic controller, a difference between the differential voltage and a target voltage. The closed-loop method also includes setting, with the electronic controller, a second amount of current or voltage to reduce the difference between the differential voltage and the target voltage. The closed-loop method further includes applying, with the electronic controller, the second amount of current or voltage to the working electrode.

EEE(15) The closed-loop method of EEE(14), wherein determining, with the electronic controller, the differential voltage between the first ISFET and the second ISFET includes determining the differential voltage between a first drain terminal of the first ISFET and a second drain terminal of the second ISFET.

EEE(16) The closed-loop method of EEE(14) or EEE(15), further comprising biasing a first source terminal of the first ISFET and a second source terminal of the second ISFET with at least one selected from a group consisting of a current source, a reference terminal with a pseudo-differential configuration, and a load impedance.

EEE(17) The closed-loop method of any one of EEE(14) to EEE(16), further comprising: measuring, with the electronic controller, a reference voltage from the reference electrode; and determining, with the electronic controller, the target voltage based at least in part on the reference voltage.

EEE(18) The closed-loop method of any one of EEE(14) to EEE(17), wherein the working electrode is a first working electrode, and wherein the closed-loop method further comprises: immersing a second working electrode of a non-feedback electrode set in the active solution; and applying, with the electronic controller, the second amount of current or voltage to the second working electrode.

EEE(19) The closed-loop method of any one of EEE(14) to EEE(18), wherein the active solution comprises a pH modulation reagent and an analyte labeled with a pH-sensitive label, wherein a pH modulation zone is formed near a surface of the working electrode, wherein the pH-sensitive label of the analyte in the pH modulation zone produces a signal, and wherein the closed-loop method further comprises detecting the signal produced by the pH-sensitive label in the pH modulation zone.

EEE(20) The closed-loop method of EEE(19), wherein the surface of the working electrode comprises a capture agent, and wherein the closed-loop method further comprises coupling the analyte to the capture agent.

Thus, the disclosure provides, among other things, closed-loop systems and methods for controlling pH. Various features and advantages are set forth in the following claims.

In the foregoing specification, specific implementations have been described.

However, one of ordinary skill in the art appreciates that various modifications and changes may be made without departing from the scope of the claims set forth below. Accordingly, the specification and figures are to be regarded in an illustrative rather than a restrictive sense, and all such modifications are intended to be included within the scope of the disclosure.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. A closed-loop system for controlling pH, the closed-loop system comprising:
    a feedback electrode set including:
        a working electrode immersible in an active solution,
        a counter electrode immersible in the active solution,
        a reference electrode immersible in the active solution,
        a sensing element including a first ion-sensitive field-effect transistor (ISFET) having a first sensing terminal immersible in the active solution, wherein a gap between the sensing element and the working electrode is in a range from 1 nanometer to 100 microns, and
        a second ISFET having a second sensing terminal immersible in a reference solution; and
    an electronic controller coupled to the feedback electrode set and configured to:
        apply a first amount of current or voltage to the working electrode,
        determine a differential voltage between the first ISFET and the second ISFET,
        determine a difference between the differential voltage and a target voltage,
        set a second amount of current or voltage to reduce the difference between the differential voltage and the target voltage, and
        apply the second amount of current or voltage to the working electrode.

2. The closed-loop system of claim 1, wherein the electronic controller is coupled to a first drain terminal of the first ISFET and to a second drain terminal of the second ISFET, and wherein, to determine the differential voltage between the first ISFET and the second ISFET, the electronic controller is further configured to determine the differential voltage between the first drain terminal and the second drain terminal.

3. The closed-loop system of claim 2, wherein a first source terminal of the first ISFET is coupled to a second source terminal of the second ISFET, and wherein the first source terminal and the second source terminal are biased using at least one selected from the group consisting of a current source, a reference terminal with a pseudo-differential configuration, and a load impedance.

4. The closed-loop system of claim 2, wherein the first drain terminal is coupled to a first load, and wherein the second drain terminal is coupled to a second load.

5. The closed-loop system of claim 4, wherein the first load includes at least one selected from the group consisting of a fixed current source, a p-channel metal-oxide-semiconductor field-effect transistor (MOSFET), a cascaded p-channel MOSFET, a resistor, and a resonant circuit.

6. The closed-loop system of claim 1, wherein the active solution is physically separate from the reference solution.

7. The closed-loop system of claim 1, wherein the active solution is isolated from the reference solution.

8. The closed-loop system of claim 1, wherein the electronic controller is further configured to:
measure a reference voltage from the reference electrode, and
determine the target voltage based at least in part on the reference voltage.

9. The closed-loop system of claim 1, wherein the working electrode and the counter electrode are coupled to a current or voltage source, and wherein the electronic controller is further configured to apply the first amount of current or voltage and the second amount of current or voltage via the current or voltage source.

10. The closed-loop system of claim 1, wherein the feedback electrode set is one of a plurality of feedback electrode sets arranged in an array.

11. The closed-loop system of claim 10, further including a plurality of non-feedback electrode sets arranged in the array, wherein each of the plurality of non-feedback electrode sets including the working electrode and the counter electrode.

12. The closed-loop system of claim 11, wherein the plurality of feedback electrode sets and the plurality of non-feedback electrode sets are positioned in different sections of the array.

13. The closed-loop system of claim 1, wherein the working electrode is a first working electrode, wherein the closed-loop system further comprises a non-feedback electrode set including a second working electrode immersible in the active solution, and wherein the electronic controller is further configured to apply the second amount of current or voltage to the second working electrode.

14. A closed-loop method for controlling pH, the closed-loop method comprising:
immersing a working electrode, a counter electrode, a reference electrode, and a first sensing element including a first ion-sensitive field-effect transistor (ISFET) having a first sensing terminal in an active solution, wherein a gap between the sensing element and the working electrode is in a range from 1 nanometer to 100 microns;
immersing a second sensing terminal of a second ISFET in a reference solution, wherein the working electrode, the counter electrode, the reference electrode, the first ISFET, and the second ISFET are included in a feedback electrode set;
applying, with an electronic controller, a first amount of current or voltage to the working electrode;
determining, with the electronic controller, a differential voltage between the first ISFET and the second ISFET;
determining, with the electronic controller, a difference between the differential voltage and a target voltage;
setting, with the electronic controller, a second amount of current or voltage to reduce the difference between the differential voltage and the target voltage; and
applying, with the electronic controller, the second amount of current or voltage to the working electrode.

15. The closed-loop method of claim 14, wherein determining, with the electronic controller, the differential voltage between the first ISFET and the second ISFET includes determining the differential voltage between a first drain terminal of the first ISFET and a second drain terminal of the second ISFET.

16. The closed-loop method of claim 15, further comprising biasing a first source terminal of the first ISFET and a second source terminal of the second ISFET with at least one selected from the group consisting of a current source, a reference terminal with a pseudo-differential configuration, and a load impedance.

17. The closed-loop method of claim 14, further comprising: measuring, with the electronic controller, a reference voltage from the reference electrode; and determining, with the electronic controller, the target voltage based at least in part on the reference voltage.

18. The closed-loop method of claim 14, wherein the working electrode is a first working electrode, and wherein the closed-loop method further comprises:
immersing a second working electrode of a non-feedback electrode set in the active solution; and
applying, with the electronic controller, the second amount of current or voltage to the second working electrode.

19. A closed-loop method for controlling pH, the closed-loop method comprising:
immersing a working electrode, a counter electrode, a reference electrode, and a first sensing terminal of a first ion-sensitive field-effect transistor (ISFET) in an active solution;
immersing a second sensing terminal of a second ISFET in a reference solution, wherein the working electrode, the counter electrode, the reference electrode, the first ISFET, and the second ISFET are included in a feedback electrode set;
applying, with an electronic controller, a first amount of current or voltage to the working electrode;
determining, with the electronic controller, a differential voltage between the first ISFET and the second ISFET;
determining, with the electronic controller, a difference between the differential voltage and a target voltage;
setting, with the electronic controller, a second amount of current or voltage to reduce the difference between the differential voltage and the target voltage; and
applying, with the electronic controller, the second amount of current or voltage to the working electrode,
wherein the active solution comprises a pH modulation reagent and an analyte labeled with a pH-sensitive label, wherein a pH modulation zone is formed near a surface of the working electrode, wherein the pH-sensitive label of the analyte in the pH modulation zone produces a signal, and wherein the closed-loop method further comprises detecting the signal produced by the pH-sensitive label in the pH modulation zone.

20. The closed-loop method of claim 19, wherein the surface of the working electrode comprises a capture agent, and wherein the closed-loop method further comprises coupling the analyte to the capture agent.

* * * * *